(12) United States Patent
Russell et al.

(10) Patent No.: US 6,524,032 B2
(45) Date of Patent: Feb. 25, 2003

(54) HIGH CAPACITY NONCONCENTRIC STRUCTURAL CONNECTORS AND METHOD OF USE

(75) Inventors: Larry R. Russell, Houston, TX (US); Phillip A. Abbott, Katy, TX (US)

(73) Assignee: CSO Aker Maritime, Inc., Houston, TX (US)

( * ) Notice: Subject to any disclaimer, the term of this patent is extended or adjusted under 35 U.S.C. 154(b) by 0 days.

(21) Appl. No.: 09/916,551

(22) Filed: Jul. 27, 2001

(65) Prior Publication Data

US 2002/0041795 A1 Apr. 11, 2002

Related U.S. Application Data

(63) Continuation-in-part of application No. 09/686,535, filed on Oct. 10, 2000.

(51) Int. Cl.$^7$ .............................. E02D 5/08; B25G 3/02
(52) U.S. Cl. .................. 405/251; 405/195.1; 405/204; 405/244; 403/364; 285/338; 285/342; 285/346
(58) Field of Search .................. 405/204, 206, 405/231, 232, 239, 244, 251, 195.1; 285/24, 26, 123.1, 123.4, 374, 375, 338, 342, 346, 339; 403/282, 361, 364, 368, 398; 166/242.6, 242.7, 348

(56) References Cited

U.S. PATENT DOCUMENTS

| | | | |
|---|---|---|---|
| 3,397,545 A | | 8/1968 | Leavitt |
| 3,612,578 A | * | 10/1971 | Bagnulo ................. 285/374 X |
| 3,716,994 A | * | 2/1973 | Pogonowski ............... 405/204 |
| 3,751,078 A | * | 8/1973 | O'Brian et al. ......... 285/374 X |
| 3,797,438 A | | 3/1974 | Fayren |
| 3,844,589 A | * | 10/1974 | Bram ......................... 285/184 |
| 3,986,471 A | | 10/1976 | Haselton |
| 4,062,313 A | | 12/1977 | Stram |
| 4,167,970 A | * | 9/1979 | Cowan ........................ 285/141 |
| 4,212,561 A | | 7/1980 | Wipkink |
| 4,220,176 A | | 9/1980 | Russell |
| 4,254,836 A | | 3/1981 | Russell |
| 4,266,496 A | | 5/1981 | Carlsen |
| 4,329,088 A | | 5/1982 | Lucas |
| 4,453,859 A | | 6/1984 | Sédillot et al. |
| 4,455,108 A | | 6/1984 | Lausberg |

(List continued on next page.)

FOREIGN PATENT DOCUMENTS

| | | | |
|---|---|---|---|
| DE | 3419633 | * 11/1985 | ................. 285/342 |
| WO | WO 00/58598 A1 | 10/2000 | |
| WO | WO 00/63519 A2 | 10/2000 | |

OTHER PUBLICATIONS

"Unstayed Flat Heads and Covers," ASME Pressure Vessel Code, Section VIII, Division I, Subsection A, Part UG–34, 1986 Edition, pp. 36–40.
"RDS, RD & RDL Rotary Slips," Den–con Tool Co. 1998–1999 General Catalog, p. 532 & 544.
"Canister Guard," M & M International, Bulletin 9312.
"Drill Stem Valves," Hydril Co., Catalog No. 9106, pp. 1–20.
"KellyGuard" Hydril Co., Bulletin 6601, pp. 1–14.

Primary Examiner—Jong-Suk Lee
(74) Attorney, Agent, or Firm—Klein, O'Neill & Singh, LLP

(57) ABSTRACT

A connector is provided for removably attaching a space frame to the hull of a floating offshore platform. The connector comprises a socket attached to the hull of the platform. The socket has an open bore therein. A stabbing member is attached to the space frame. The stabbing member has a lower end insertable into the socket. An expandable locking ring is carried by the lower end of the stabbing member. The locking ring comprises a plurality of ring segments for removably seating within the socket bore. A backup ring is slidable along the stabbing member. The backup ring removably mates to the locking ring.

53 Claims, 11 Drawing Sheets

U.S. PATENT DOCUMENTS

| | | | | |
|---|---|---|---|---|
| 4,460,042 A | * | 7/1984 | Galle, Jr. | 166/217 |
| 4,468,157 A | | 8/1984 | Horton | |
| 4,730,851 A | * | 3/1988 | Watts | 285/317 X |
| 4,823,719 A | | 4/1989 | Sarwe | |
| 4,886,113 A | * | 12/1989 | Ross et al. | 285/321 X |
| 4,930,938 A | * | 6/1990 | Rawstron et al. | 405/204 |
| 5,004,272 A | * | 4/1991 | Kipp | 285/24 |
| 5,029,904 A | * | 7/1991 | Hunt | 285/24 |
| 5,219,451 A | * | 6/1993 | Datta et al. | 405/204 |
| 5,380,229 A | * | 1/1995 | Korsgaard | 114/293 X |
| 5,522,680 A | * | 6/1996 | Hoss et al. | 405/204 X |
| 5,609,442 A | | 3/1997 | Horton | |
| 5,722,797 A | | 3/1998 | Horton, III | |
| 6,024,040 A | | 2/2000 | Thomas | |
| 6,092,483 A | | 7/2000 | Allen et al. | |
| 6,113,314 A | * | 9/2000 | Campbell | 405/195.1 X |

* cited by examiner

HIGH CAPACITY NONCONCENTRIC STRUCTURAL CONNECTORS AND METHOD OF USE

CROSS-REFERENCE TO RELATED APPLICATIONS

This application is a Continuation-in-Part of copending U.S. patent application Ser. No. 09/686,535, filed Oct. 10, 2000, for "Heave Suppressed Offshore Drilling and Production Platform."

STATEMENT REGARDING FEDERALLY SPONSORED RESEARCH OR DEVELOPMENT

Not Applicable.

BACKGROUND OF THE INVENTION

The present invention relates to structural connections for offshore platforms and, more particularly, is concerned with a high capacity nonconcentric structural connector for floating drilling and production platforms that are used in the exploration and production of offshore oil and gas.

BRIEF SUMMARY OF THE INVENTION

An object of this invention is to provide a high capacity structural connection between a dependent space frame attached to a damper plate and a vessel hull. The structural connection must be suitable for reliable, long term service in an open ocean marine environment. An additional objects of this invention is to provide a high capacity, rigid structural connection that can accommodate a substantial axial offset between the two sides of the connection. A further object of this invention is to provide a high capacity structural connection that can be completely assembled or disassembled repeatably by a few workers within a short time. An additional object of this invention is to provide a mounting pattern of structural connections which has high strength and high stiffness in three orthogonal directions when the individual structural connections have high strength and high stiffness in only two orthogonal directions. The connection of the space frame supporting the damper consists of a plurality of individual connectors. Each of the individual connectors has two portions—one the space frame and the other on the hull.

According to one aspect of the invention, a connector is provided for removably attaching a space frame to the hull of a floating offshore platform. The connector comprises a socket attached to the hull of the platform. The socket has an open bore therein. A stabbing member is attached to the space frame. The stabbing member has a lower end insertable into the socket. An expandable locking ring is carried by the lower end of the stabbing member. The locking ring comprises a plurality of ring segments for removably seating within the socket bore. A backup ring is slidable along the stabbing member. The backup ring removably mates to the locking ring.

According to a second aspect of the invention, a connector is provided for removably attaching a space frame to the hull of a floating offshore platform. The connector comprises a socket attached to the hull of the platform. The socket has an open bore therein. A floor is in the open bore. A latching groove is formed in the socket bore. A stabbing member is attached to the space frame. The stabbing member has a lower end insertable into the socket and an upset head at its lower end. The upset head is removably seatable on the socket floor. The lower end of the stabbing member carries an expandable locking ring. The locking ring comprises a plurality of ring segments for removably seating within the latching groove in the socket bore. The locking ring has a tapered bore therein. A backup ring is downwardly slidable along the stabbing member. The backup ring has a tapered outer surface for removably mating to the tapered bore of the locking ring. A plurality of slip wedges are removably seatable within the socket bore and against the stabbing member. Means is provided for lowering the backup ring from a raised position above the socket to a lowered position seated within the socket.

According to a third aspect of the invention, a method is provided for connecting a space frame to the hull of a floating offshore platform. The method comprises inserting the lower end of a stabbing member attached to the space frame into a socket attached to the hull of the platform. The stabbing member carries an expandable locking ring thereon. The method further comprises lowering a backup ring into mating engagement with the locking ring so as to expand segments of the locking ring into engagement with the socket wall. The method further comprises lowering a plurality of slip wedges into engagement with the socket wall and into engagement with the stabbing member for providing lateral restraint to the stabbing member.

DETAILED DESCRIPTION OF THE INVENTION

Figure 1:
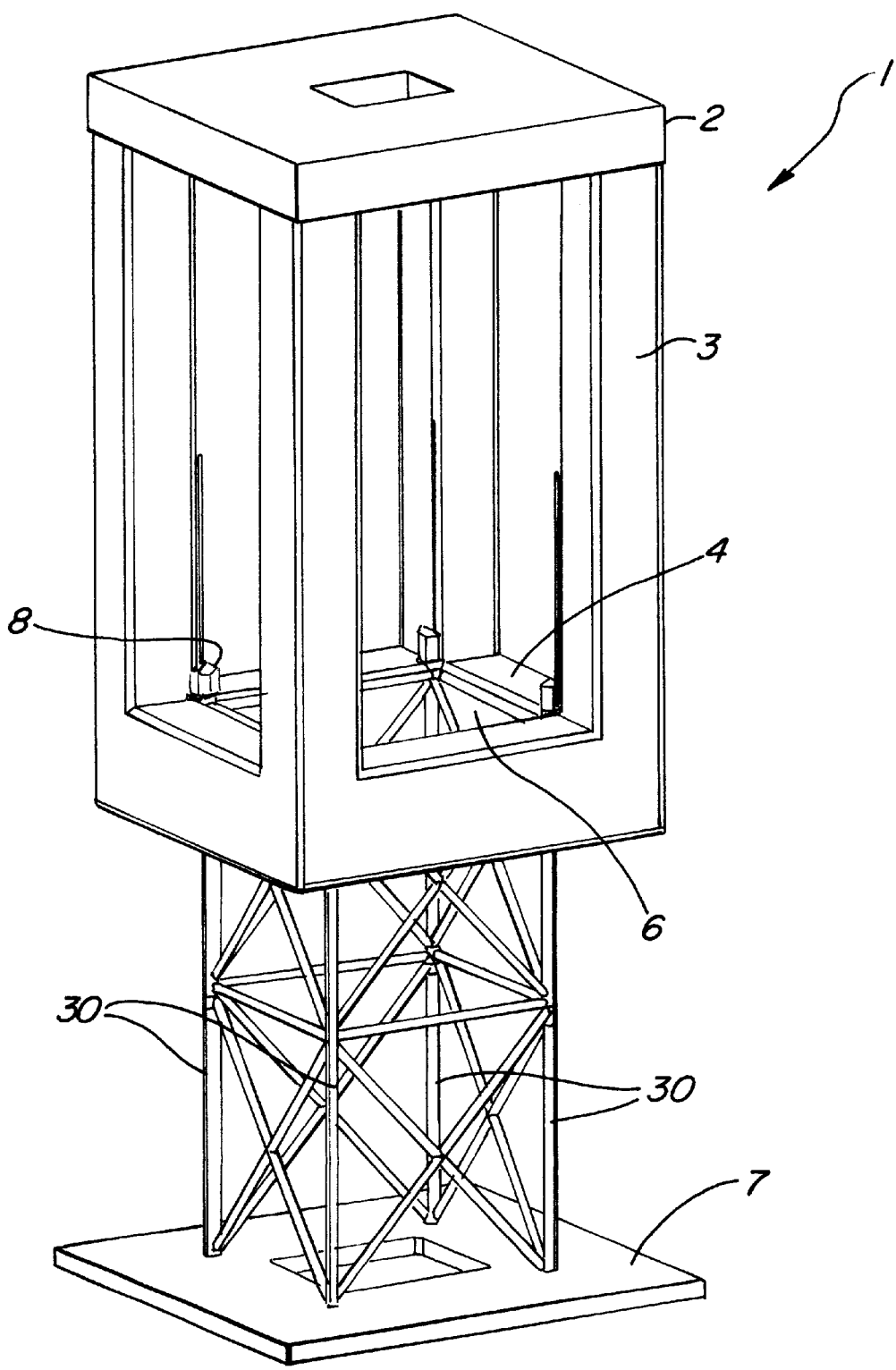
FIG. 1 is an oblique view of a floating production platform having a space frame supporting a damper plate attached to its hull using the connections of this invention.

A suitable semisubmersible hull having one or more clear spaces between its lower pontoons can be fitted with one or more damper plates suspended below the hull by means of a truss or space frame fitting within the clear spaces and which are in turn connected to the hull. The semisubmersible hull is to be moored permanently with a spread mooring in deep water, where it serves as a production facility for petroleum products. While semisubmersibles generally have very low motions, for certain applications their motions become unacceptable in severe waves unless damper plates are used. It is desirable to build a semisubmersible with such damper plates in a convenient shipyard. However, channel depths limit the vessel draft so that the damper plates cannot be lowered to their operational positions until the vessel has reached deep water. Accordingly, special connections are needed so that the upper end of a lowered truss or space frame can be fixed structurally at the top of each of its legs to the hull.

The connectors have to provide high strength for loads which may be on the order of 8,000,000 pounds vertically and 3,000,000 pounds in the horizontal plane. Although these loads are very large, the connectors must be stiff (i.e., with low distortions) in order to avoid excessive stress or vibration. Additionally, realistic fabrication tolerances may cause the location of the space frame side of a connection to deviate from its planned location relative to the hull side of the same connector by as much as an inch. These connectors will be submerged in service and are required to have a service life of upwards of 25 years. If the hull needs to be moved following ceasing of production or for other reasons, the space frames must be disconnected and pulled back up into the hull for transit back to port or for any distance. The connecting and disconnecting of the connectors must be performed rapidly (i.e., in less than 12 hours) in order to avoid weather sensitivity when the space frame is only partially connected to the hull. In some cases it may be necessary for divers to perform the disconnecting of the connectors, even though they are normally connected and disconnected when the connector is not submerged at the towout draft of the semisubmersible.

The making of structural connections involves some of the oldest technology in use today. However, there are not many means for making structural connections which are suitable for rapid assembly, for very large loads and for which large, unpredictable, noncorrectable variations in the relative positions of the two sides of the connection are present at mating. Both the magnitude of the loads on the structure and the size of the hull and space frame are very large. In addition, the hull and space frame may be built in different places. Therefore, the axial offset in a particular connection can be as much as one inch (25.4 mm). Both the hull and the space frame normally would be fabricated in their final alignments, rather than on their sides. Accordingly, it may be assumed that careful fabrication procedures would make it possible to control the vertical positions of the mating surfaces of the parts with fairly good accuracy; i.e., within +/−1/16 inch (1.6 mm). The significant uncertainty in position therefore would be limited to the horizontal plane.

The choices of connections for marine conditions are even more limited than for onshore, since corrosion, metal fatigue, and the need for rapid and reliable assembly are particularly critical there. The requirement of rapid assembly is important so that the connections will not be vulnerable to increased loading due to an unexpected increase in wave conditions when only part of the set of connectors are made up. For example, if only one or two of a set of three or four connectors are made up, the made up connectors are susceptible to severe overload at much less energetic wave conditions than for their survival with all connectors fully made up. Thus, when the additional requirements of rapid disassembly and repeatable assembly/disassembly are added, there are very few choices of suitable connection types.

In general, screwed connections using one nut or hollow screw per connection can be eliminated on the basis of the extreme make-up torque necessary. This would be the case for both conventional and interrupted threads, such as in a breech block connection. The large offsets possible in the connection also make pins and sockets with single transverse pins, pins and sockets with multiple radial bolts or pins engaged into threads or sockets in the pin, shrink fits, and collets generally impractical. Similarly, using multiple balls inserted into the groove space of pins and sockets with semitoroidal annular grooves is not practical because very good axial alignment is required. For the same reason, a socket connection using a plug with an axially compressible skewed plane interface between the two plug halves, such as is used in connecting the handlebar mount into the tube of the front wheel fork on a bicycle, is not practical. Multiple radial bolts threaded into the socket can be combined with multiple bolts offset from the axis and mounted to the rim of the socket so that they can abut an upset head of the pin. However, the very large number and size of the bolts make the proper torqueing of these bolts a complex and time consuming operation.

One possible means of making a suitable connection is to weld both sides of the connection together. A very common approach offshore is to stab two tubes together and make a circumferential weld to hold them. Another type of welded connection would involve lapping or butting two connection plates and, using shims as fillers as necessary, welding them together with fillets or other appropriate welds. For the typical connection anticipated, the weld cross-section can easily be multiple hundreds of square inches. Thus, these approaches are not attractive when very large loads must be carried, because the time required to make the welds and the significant possibility of internal flaws on the very large welds and plates required make welding unattractive. Oxyacetylene burning can be used for quickly disconnecting the joint, and the joint typically can be rewelded more than once. However, the slow assembly and potential reliability problems for very large welded joints are considered excessively problematic for connections between hulls and damper plate supports.

Another possible means is to use bolted connections. Since the loadings on a typical connection are generally biaxial or triaxial relative to its plane of symmetry, a bolted connection for the large loading considered here will typically have a very large number of large bolts and will work in a combination of shear and tension/compression. Field measured and installed shims would be required to fill the gaps between the members, and the bolt holes would have to be considerably more oversized than is considered reasonable by structural design codes. Additionally, the shims might be very difficult to install in field conditions, with tapered gaps being a particularly difficult problem. However, the worst problems for bolted joints are bolt corrosion and the very long times required to properly torque the bolts to obtain some semblance of the required uniform pretension for the bolts. The high pretensions for bolts and the reentrant thread roots are a particularly problematic combination in salt water. For these reasons, the use of bolted connections is not attractive for the attachment of damper plate space frames to hulls.

Grouting of the annulus between two stabbed and substantially concentric tubes is another means for making the desired connections. Grouting is generally used in connecting pilings to tubular receptacles for bottom-founded offshore platforms. This method could be adapted to the space frame-to-hull connection by extending vertical plates from the vertical members of the space frame and engaging those members within groutable elongate chambers having integral seals and built into the hull. However, the setting time for grout generally is fairly long, being on the order of multiple days to attain 90% of its ultimate strength. Another consideration is that uncertainties about the in situ strength of the grout are always present. The potential for large eccentricity of the grouted connection also can reduce seal reliability. Finally, removal of grout from a necessarily long grouted connection is very time consuming. Accordingly, the use of grouted connections for the connection of the damper plate space frame to the hull is not desirable.

Another connection means utilizes rack and pinion jacking systems of the type commonly used on jackup drilling rigs to lower a single damping plate by its multiple supporting space frames. The jack racks for an individual jack are attached to a chord of the space frame with the teeth of the racks facing outwardly in opposite directions. The connector for fixing the space frames to the semisubmersible hull uses opposed secondary racks that intermesh with the jack racks to mesh with and clamp the jack racks. Means are provided for entrapping the secondary racks in their clamping positions and for transferring the loads across the connection by shear and/or bearing. This particular connector is only suitable for use with large racks. Additionally, such a connector cannot support significant loads out of the plane of the pair of jack racks for the connector. A further limitation of this connector is its complexity and large parts count, both of which tend to reduce reliability and increase cost.

One class of connection means is somewhat more promising for handling axial loads, but must be provided with separate means for supporting lateral loads. Radially engagable latch dogs, extending inwardly through windows in a mounting housing and operated by an external axially shiftable sleeve, satisfy most of the criteria for resisting axial (vertical) loads, but would tend to have excessive "play". Axial play is undesirable because it tends to result in high load amplifications under load reversals. If latch dogs are mounted in windows in a housing and operated by radial bolts, then their mating faces can be slightly tapered so that axial play is eliminated, as long as only very small axial eccentricities are involved. It should be noted that bolt sizes and numbers make this means practical only if separate means are used for lateral load resistance. An additional drawback is that the cutting of substantial windows in large parts can lead to very high stresses and much larger structures. Other possible connectors exist, but most are quite limited in their capability to tolerate axial offsets of the connecting members. Further, several of the connections are overly large and expensive. Connections which use wedges can be made reasonably, but wedges can "work" under oscillating loads so that they can become excessively difficult to disassemble.

What is required for this class of connections is something which is reliable, is simple to fabricate, and is easy to assemble and disassemble. Additionally, the connection should have a structure which behaves in a generally well understood manner, is not subject to high stress concentrations, and which does not have heavy weldments.

This invention provides mechanical connection means for joining a tubular space frame carrying a damper plate to a semisubmersible hull for the purpose of reducing wave induced motions of the hull. These connectors are field-assembled and must be assembled in a very short time. One side of each of the multiple connectors is supported by the lower pontoon of the hull and the other side is fixed to the upper end of the space frame. The mechanical connectors, used in sets of three or more, are readily installed and uninstalled in a repeatable manner in the field. The connectors are configured not only to carry very high loads, but also to accommodate considerable axial offsets between the two sides of the connectors, where such offsets can result from the accumulation of construction tolerances.

FIG. 1 shows a semisubmersible rig 1 of the type described in copending U.S. patent application Ser. No. 09/686,535, filed Oct. 10, 2000, for "Heave Suppressed Offshore Drilling and Production Platform." This patent application relates to a system for attaching a dependent heave or damper plate to a semisubmersible for the purpose of substantially minimizing the motions of the vessel.

Rig 1 has one or more working decks 2 at its upper end. Deck 2 must be supported by three or more legs 3 which extend downwardly from the deck to the lower pontoon 4. In this case, four legs 3 are shown. The lower pontoon 4 is fabricated using typical shipyard techniques and structure. In plan view, lower pontoon 4 has a rectangular outer perimeter and a similarly shaped inner well 5. Selectably vertically moveable between the legs 3 and within the well 5 of lower pontoon 4 is tubular space frame 6, which is attached at its lower end to vertical motion resistance (VMR) heave plate or damper 7. At the upper end of space frame 6 on top of each perimeter vertical chord 30 of the space frame 6 is attached one connector 8 of this invention. Due to channel draft limitations, during travel from the fabrication yard at which this semisubmersible rig 1 is built to the final installation location in deep water offshore, the VMR heave plate or damper 7 must be elevated so that it is adjacent the lower side of the lower pontoon 4. Once the rig 1 is at or near its installation location, the space frame 6 and the attached damper 7 are lowered to their service position shown in FIG. 1 and then connected to the lower pontoon 4 by connectors 8.

Figure 2:
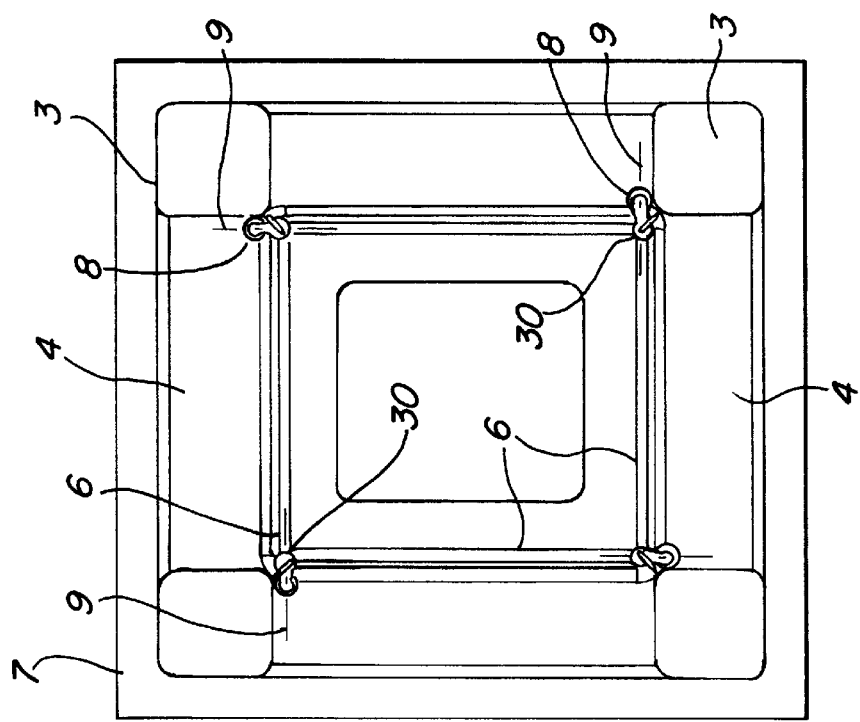
FIG. 2 is a plan view of the production platform shown in FIG. 1 with the deck of the platform removed for clarity.
Figure 4:
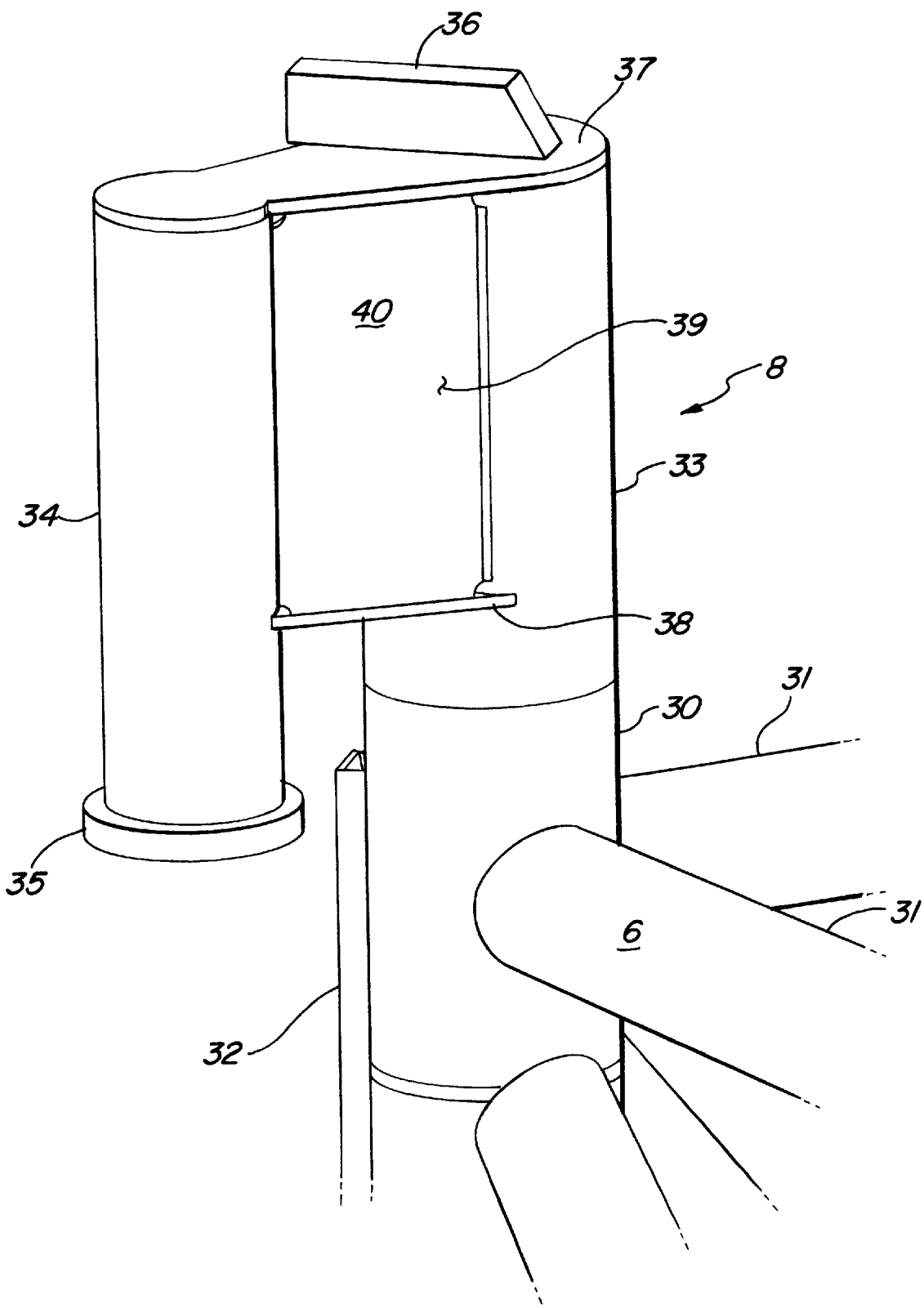
FIG. 4 is an oblique view of the stabbing portion of the connection installed on the upper end of a chord member of the space frame which supports the damper plate. For clarity, the latching hardware is not shown in this view.

The array of connectors 8 must be arranged so that the connection is structurally stable. Accordingly, a minimum of three connectors 8 are required, and at least one of the connectors 8 must not be colinear with the other connectors 8. As seen in FIGS. 2 and 4, the four connectors 8 each span from the top of one of the vertical chords 30 of space frame 6 to a lower pontoon 4 of the hull. Referring to FIG. 2, the primary loads experienced by a connector 8 are in its own vertical midplane 9, which is defined by the vertical axis of the stabbing member 34 of the connector 8 and the center of its point of connection to the space frame 6. The stiffness and strength of a connector 8 for loads perpendicular to its vertical midplane 9 are much weaker than for loads parallel to the vertical midplane 9. Each connector 8 is rotated 90° relative to its neighboring connector on either side in an arrangement which causes the connector 8 to experience only minor lateral loads in its relatively weak and flexible direction transverse to its vertical midplane 9. The transverse loads which would otherwise be experienced by a connector 8 are instead absorbed by its closest neighbors in their strong directions, which are in their vertical midplanes. This arrangement works because of the difference in stiffness for in-midplane loads versus out-of-midplane loads for the connectors 8.

Figure 3:
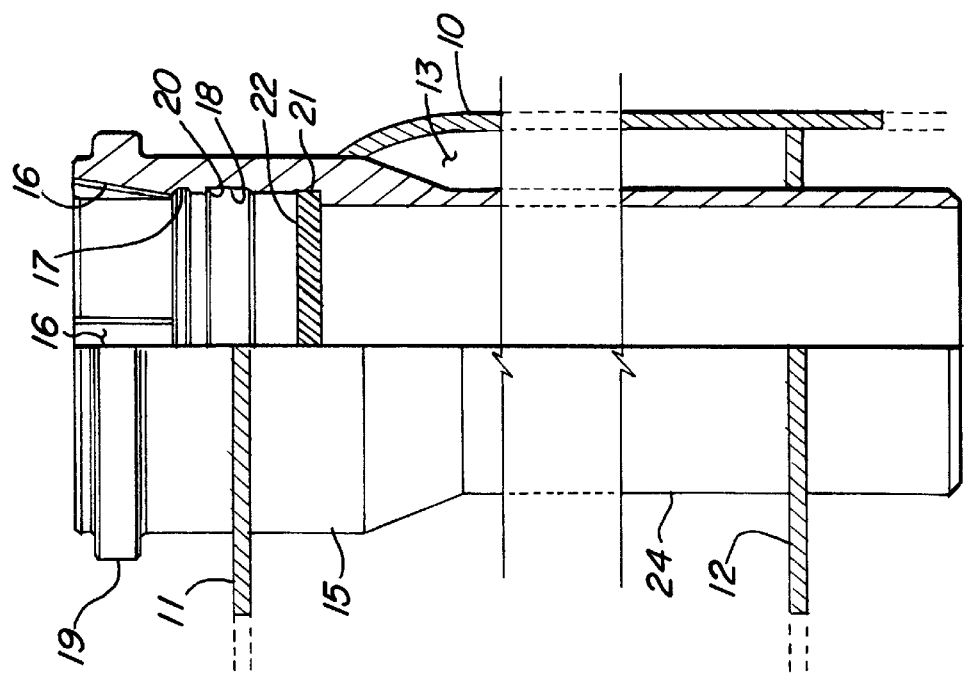
FIG. 3 is a quarter section of the socket portion of the connection of this invention installed in the upper inner side of a lower hull pontoon. In order to better illustrate both the structural framing and the slip ramps at the top of the socket, the socket is rotated 45° about the socket axis from its actual position.
Figure 9:
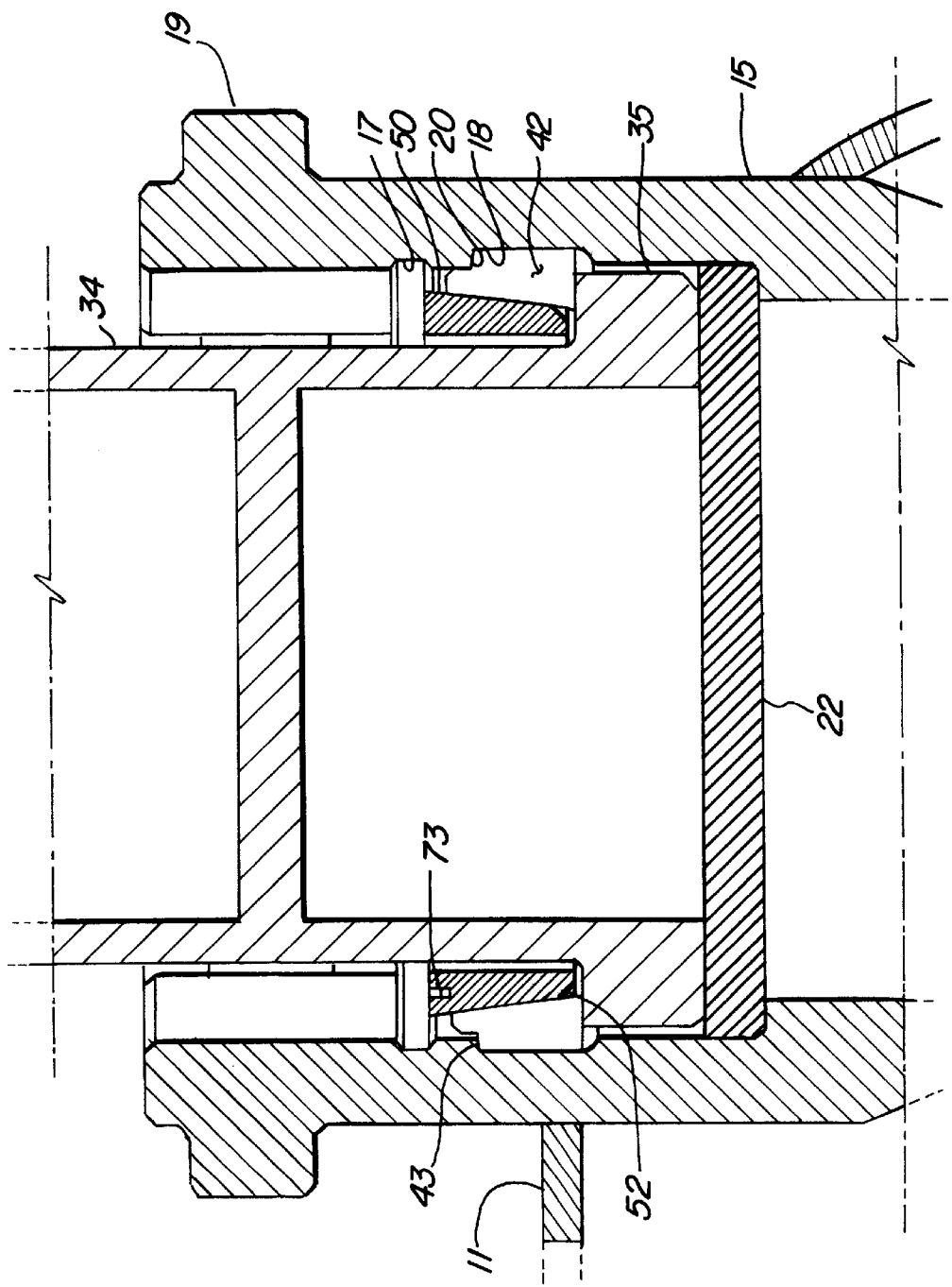
FIG. 9 is a sectional view showing in detail the upper end of the socket with the locking ring segments locked in place.
Figure 10:
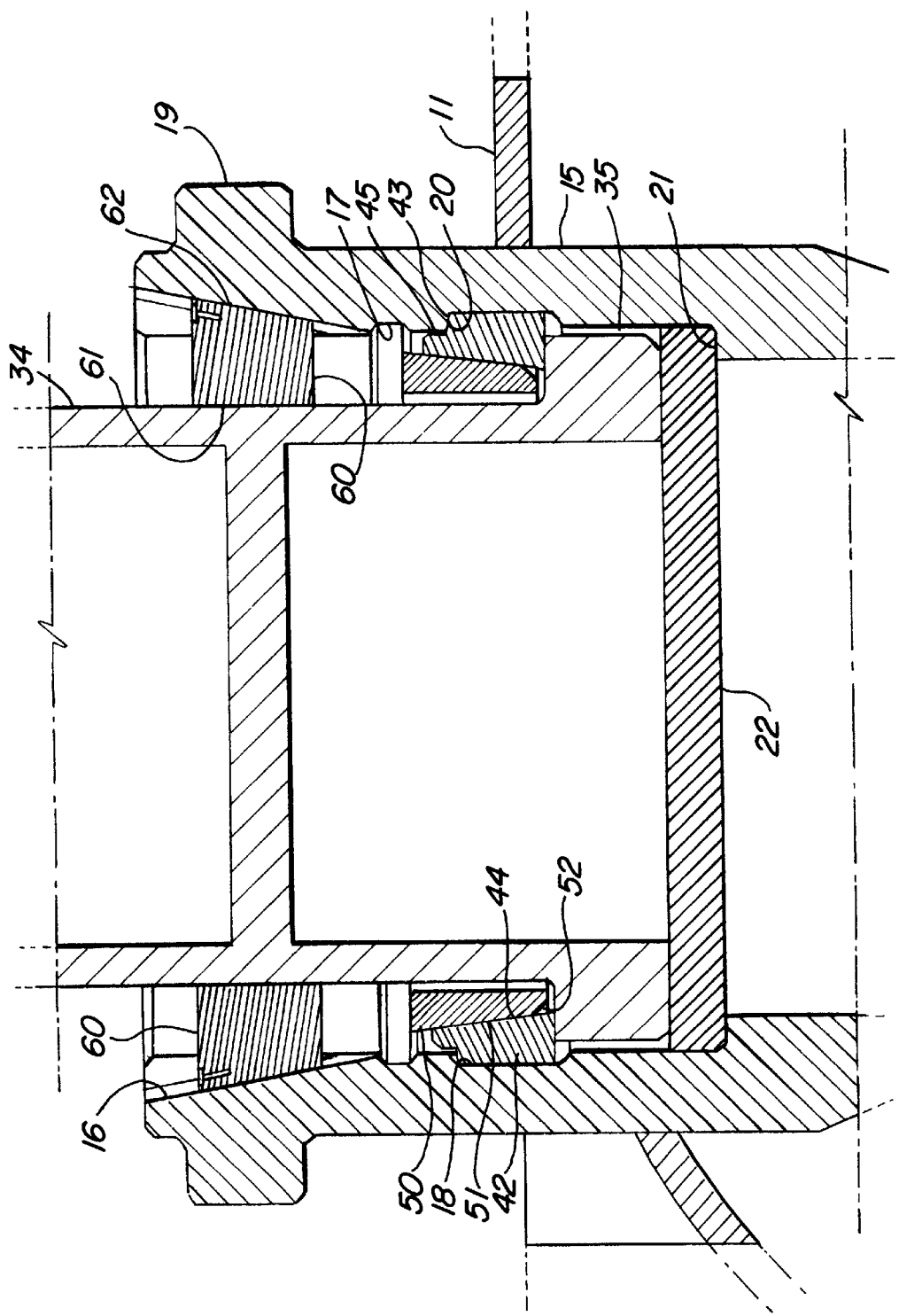
FIG. 10 is a vertical sectional view showing in detail the upper end of the socket with the slip wedges in place to complete the connection.

Referring to FIG. 3, a quarter sectional view of a socket 15 mounted in a lower pontoon 4 of the hull is shown. The socket is attached to the lower pontoon 4 by welding. The socket 15 is supported for horizontal loads primarily by the top shell 11 and a lower framing horizontal bulkhead 12 of lower pontoon 4, while the side shell 10 supports the socket 15 vertically by means of interconnected internal bulkhead 13. Socket 15 is of generally tubular construction with a heavy-wall upper section and a ring stiffener 19 near the top. Sequentially from the upper end of the socket 15 and extending downwardly, the bore of the socket 15 contains: four identical equispaced ramps 16, an annular shaper relief groove 17 which intersects the lower end of the ramps 16, an annular latching groove 18, and an upward looking transverse shoulder 21. The ramps 16, which have planar sides and are inclined relative to the axis of socket 15, start at the top of socket 15 and are inclined inwardly from the top. Shaper relief groove 17 has a short length and rounded corners and serves to permit ramps 16 to be cut by a shaper. Upper conical surface 20 is located at the upper end of annular latching groove 18. The interior corners of annular latching groove 18 are rounded for reduction of stress concentrations. Floor 22 is a thick plate disk that is supported by upward looking transverse shoulder 21. As seen in FIGS. 9 and 10, the lower end of latching groove 18 extends below the upper surface of upset head 35 of stabbing member 34 when stabbing is completed and the upset head rests on the floor 22 of the socket 15. The socket 15 has a reduced wall thickness socket extension tube 24 extending from the upper portion of the socket past lower framing bulkhead 12.

Referring to FIG. 4, the space frame side of connector 8 can be seen in an oblique view. Heavy walled extension tube 33 is attached to the top of vertical chord 30 of space frame 6. Extension tube 33 may be provided with internal diaphragms (not illustrated) for enhancing its strength and stiffness for transverse loads. The upper end of chord 30 is laterally supported by heavy tubular horizontal members 31 which frame into the chord 30 near its top. Also shown for information is chord lowering guide 32 which is welded to the side of chord 30 and serves to centralize the space frame 6 within the window in the hull during lowering. Parallel to and laterally offset from chord 30 and extension tube 33 is heavy walled tubular stabbing member 34, which has upset head 35 at its lower end and, as required, internal stiffening diaphragms (not illustrated). Upset head 35 has transverse upper and lower shoulders. Stabbing member 34 is attached to extension tube 33 by means of a heavy walled welded box beam which is symmetric about the central vertical midplane of the connector 8.

Box beam 40 is made up of top plate 37, bottom plate 38, and two side plates 39. Box beam top plate 37 also covers the upper ends of extension tube 33 and stabbing member 34. The corners of box beam side plates 39 are cut away to reduce triaxial stresses at the three-way intersections of the tubes 33 and 34, the horizontal plates 37 and 38, and the vertical box beam side plates 39. A welded substructure which serves as an upper lowering guide 36 is mounted on box beam top 37. Upper lowering guide 36 bears on a guide surface on the interior corner of adjacent leg 3 of rig 1 during lowering to further centralize the space frame 6.

Figure 5:
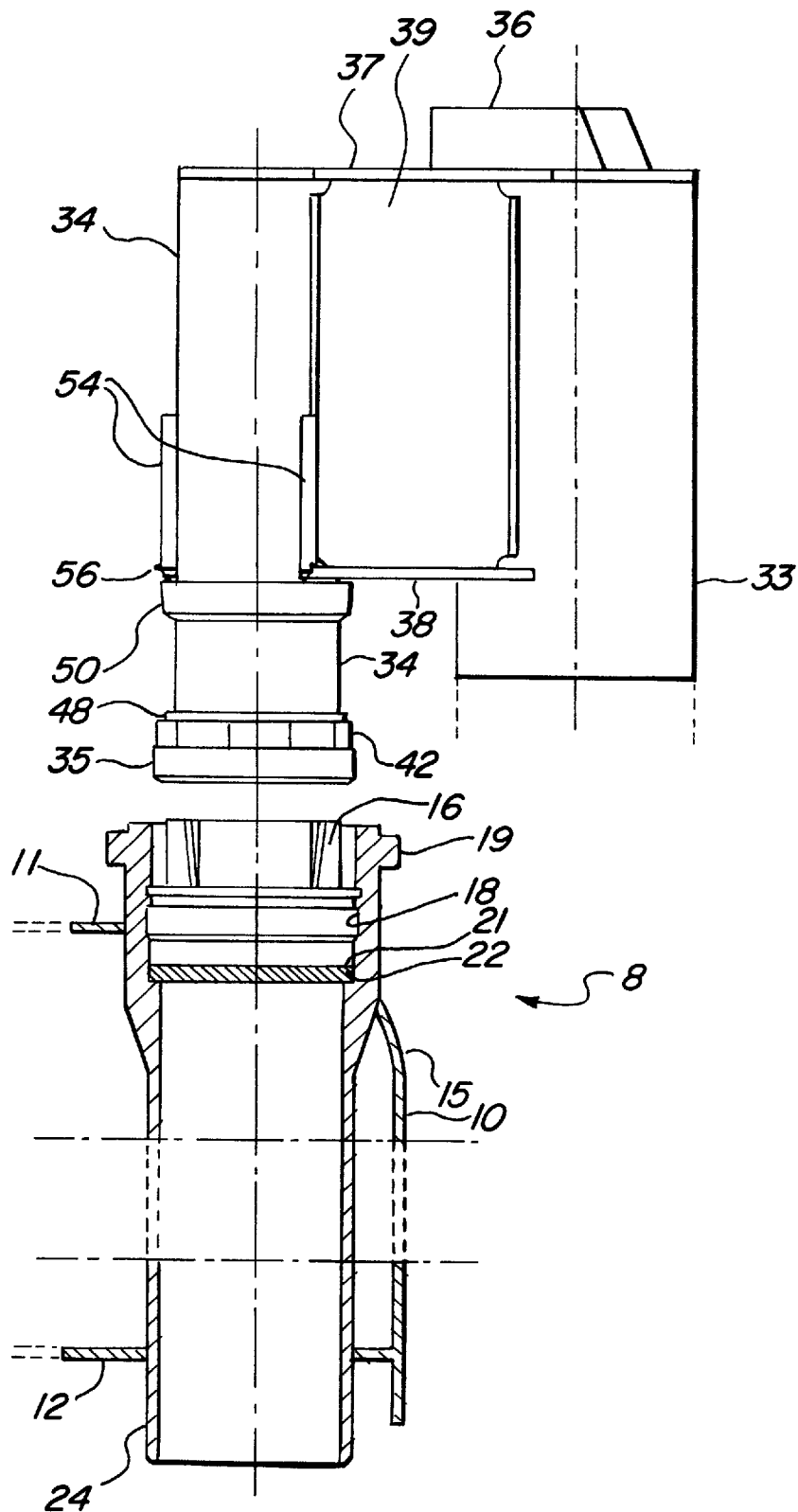
FIG. 5 is a vertical cross-sectional view of the hull-mounted socket with a space frame-mounted plug positioned for stabbing insertion into the socket. The plug is not shown in section, and the space frame is omitted for clarity.

FIG. 5 shows two of the ramps 16 in the top of socket 15 in their correct orientation. For installation clearance, the ramps 16 are rotated so that they are all 45° from the vertical midplane 9 of the connector 8. In FIG. 5, segmented locking ring 42 is seen sitting on the upper shoulder of the upset head 35 of the stabbing member 34. Locking ring 42 is radially cut into a plurality of identical segments for latching to socket 15. In the illustrated embodiment, locking ring 10 comprises ten identical segments.

FIGS. 9 and 10 more clearly show the individual features of the segmented locking ring 42 and its associated backup ring 50. The segmented locking ring 42 has an outer diameter which is equal to or slightly less than the undercut bore of the annular latching groove 18 of socket 15, a transverse lower shoulder, a conical upper shoulder 43 located near the upper end, an interior conical tapered bore 44, and an upper extension portion 45 extending above the conical upper shoulder 43 with an outer diameter less than that of the general through bore of socket 15. The tapered bore 44 has an angle of approximately 8°, which is a self-locking angle. In the illustrated embodiment, the segmented locking ring 42 is cut into 10 equal segments with arc lengths of 34°. The removed material provides sufficient clearance when the segments are grouped together on the upper shoulder of the upset head 35 so that the assemblage can be inserted into the bore of socket 15 without interference problems. Referring to FIG. 5, a retention strap 48 is placed around the upper extension 45 of the segmented locking ring 42 when it is being run into the socket 15. This strapping can be performed in various ways. Using two identical half hoops with radial tabs and bolts and nuts through vertical holes in the tabs where the half hoops can be mated permits ready removal and reinstallation when the stabbing member 34 is landed on floor 22 of socket 15.

Figure 11:
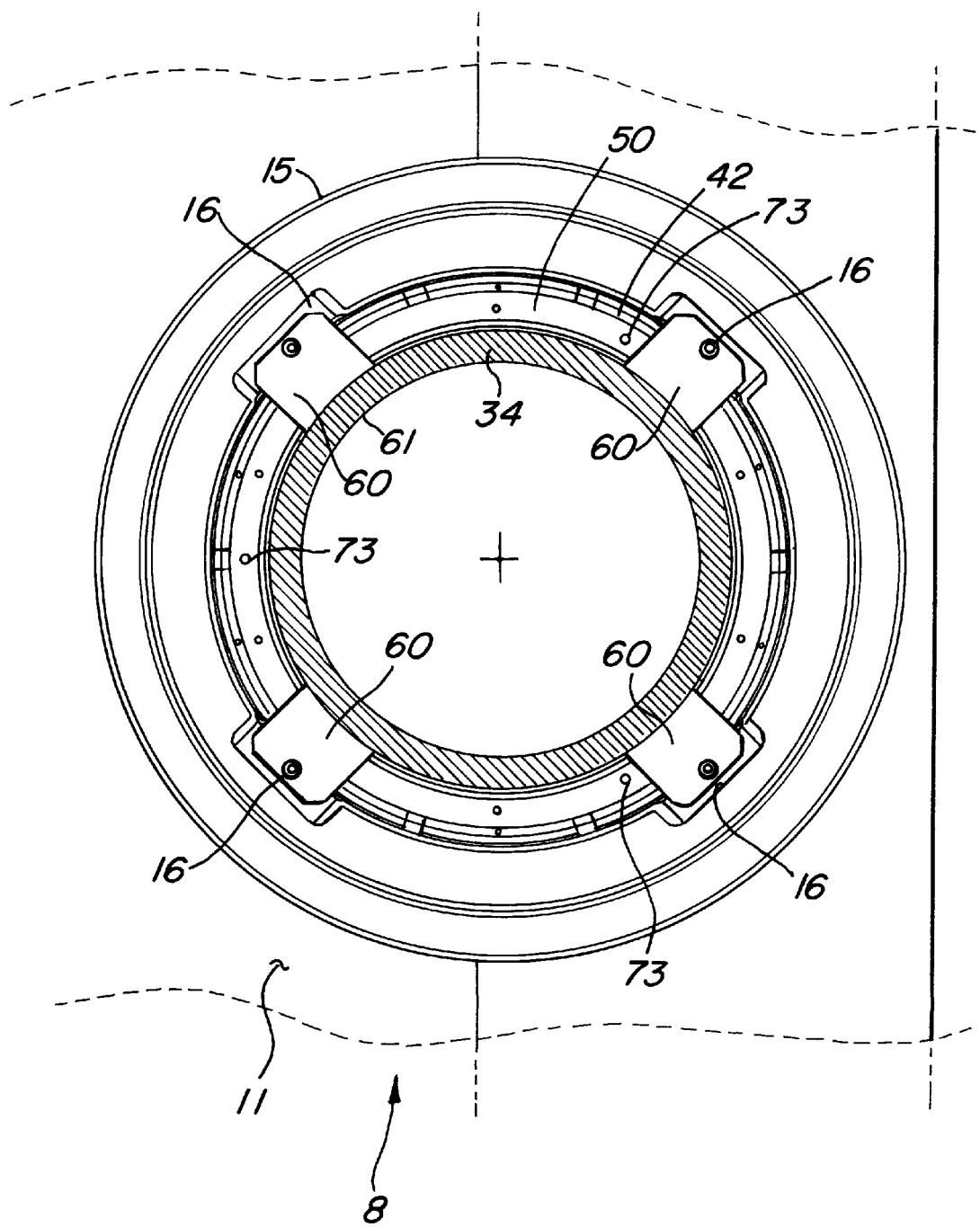
FIG. 11 is a cross-sectional view from above of the completed connection with the section cut through the plug assembly immediately above the level of the socket.

Annular backup ring 50 has a straight bore and an externally tapered outer surface 51. The taper of surface 51 matches that of the tapered bore 44 of the segmented locking ring 42. The outer diameter at the bottom of outer surface 51 is sufficiently larger than the inner diameter at the bottom of tapered bore 44 of segmented locking ring 42 so that the backup ring 50 will not prematurely abut the upper transverse shoulder of upset head 35 when expanding locking ring 42. The lower end of backup ring 50 has a liberal lead-in chamfer 52. Referring to FIGS. 9 and 11, the upper transverse shoulder of backup ring 50 has three symmetrically spaced drilled and tapped holes 73 for attachment of actuating cylinder rods 75. The diameter of the straight bore of backup ring 50 is larger than the outer diameter of the cylindrical neck of stabbing member 34 by at least twice the amount of maximum axial eccentricity between the socket 15 and the stabbing member 34 anticipated for the design. Backup ring 50 is mounted around the cylindrical neck of stabbing member 34.

Figure 6:
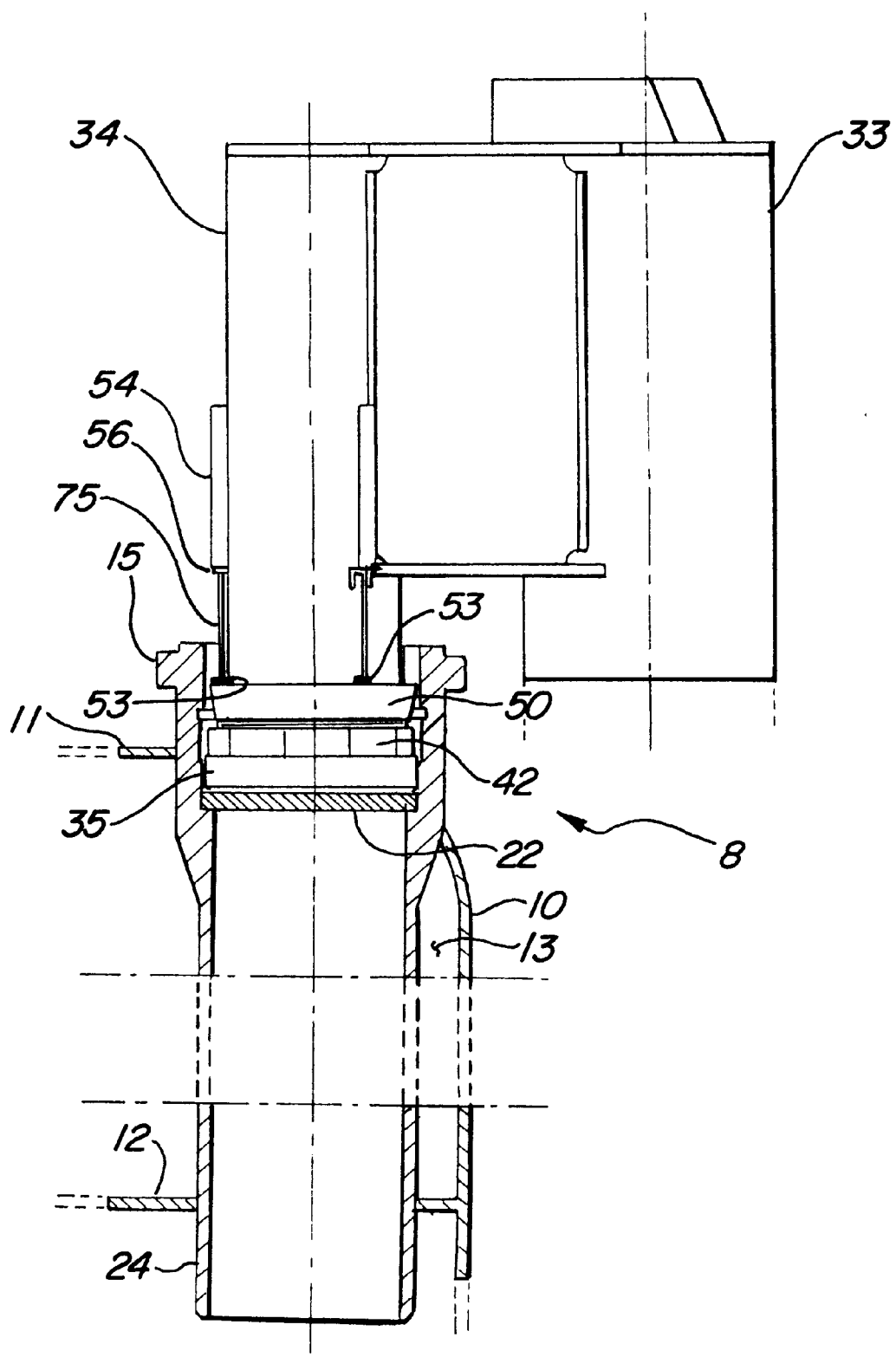
FIG. 6 is a vertical cross-sectional view corresponding to FIG. 5 and showing the plug landed in the socket side of the connection and the locking ring segments ready for radial extension outwardly into the latching groove of the socket.
Figure 8:
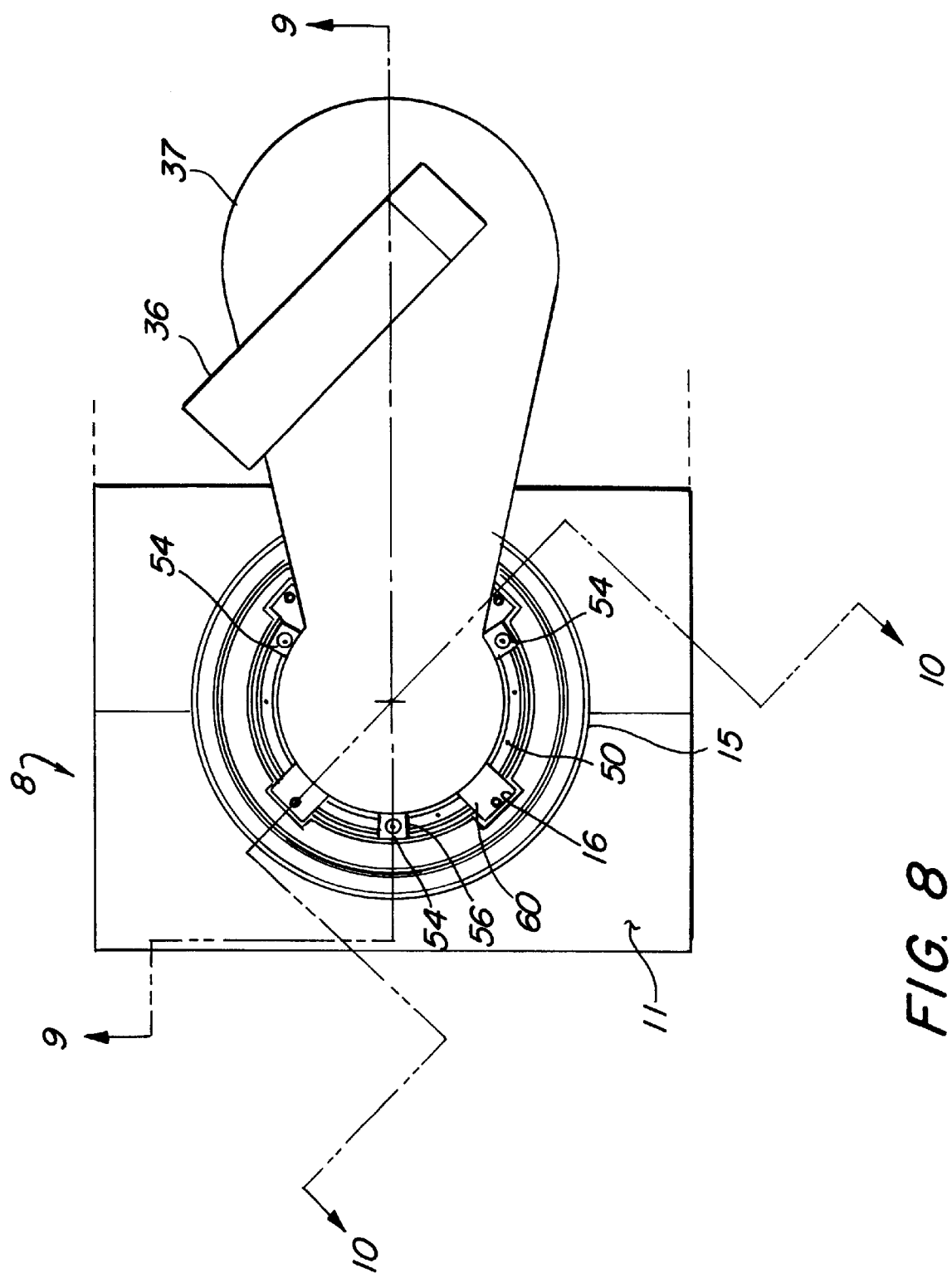
FIG. 8 shows a plan view of the completed connection.
Figure 12:
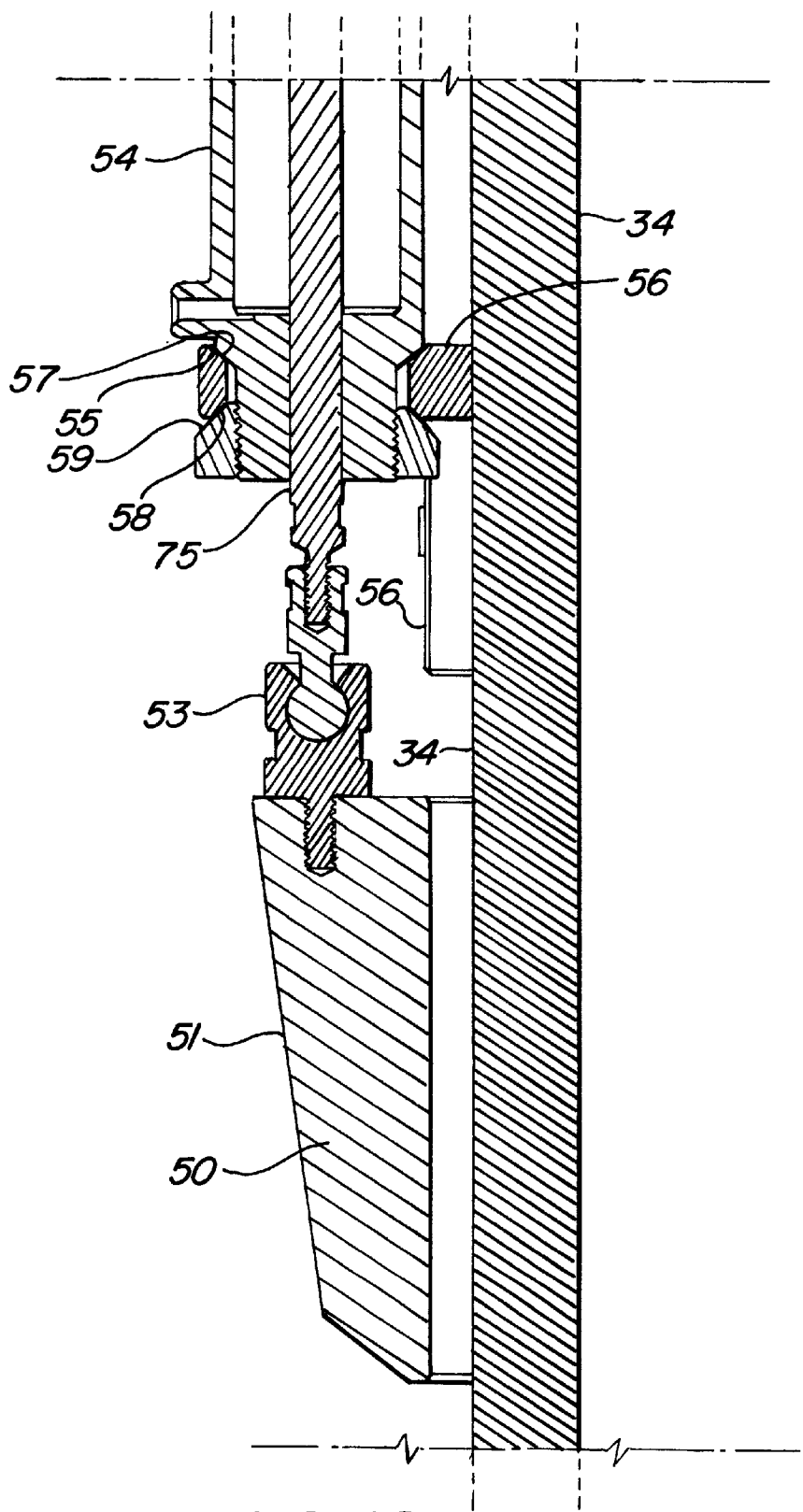
FIG. 12 is a partial longitudinal vertical cross-sectional view of a hydraulic cylinder used to raise and lower the backup ring. The section cuts through both the vertical axis of the cylinder and the axis of the stabbing member.

Referring to FIGS. 5, 6, and 8, three double-acting hydraulic cylinders 54 are mounted vertically at their cylinder rod ends to corresponding swivel mounts 56 by vertical axis holes in the swivel mounts 56. The swivel mounts 56 are in turn welded or bolted at 120° spacings about the vertical axis of stabbing member 34 above the upset head 35 and approximately at the height of the box beam bottom. As seen in FIG. 12, the lower end of the body of each hydraulic cylinder 54 has a spherical male end 55 which mates with a corresponding female spherical socket 57 on the upper face of the swivel mount 56. A cylinder retainer nut 59 having a spherical upper end is screwed onto the lower end of each of the cylinders 54 in order to retain the cylinder in the swivel mount 56. The lower face of each swivel mount 56 has a female spherical socket 58 that corresponds to, and is compatible with, the male spherical face of retainer nut 59. Because the vertical axis holes in swivel mounts 56 are slightly larger than the threaded rod ends of cylinders 54, and because retainer nuts 59 are not screwed down tightly, the cylinders 54 are able to swivel as necessary when shifting backup ring 50 vertically. The lower ends of cylinder rods 75 are provided with ball swivels 53. Ball swivels 53 are threaded both onto the rod 75 end and into the drilled and tapped holes 73 in the upper transverse surface of backup ring 50. The swiveling action of the cylinders 54 and ball swivels 53 allows backup ring 50 to shift from an axial alignment with stabbing member 34 to a parallel but eccentric alignment. The ability of the hydraulic cylinders 54 to swivel is necessary because the stabbing member 34 may be eccentric to socket 15. Since the segmented locking ring 42 has to be seated in the concentric annular latching groove 18 of socket 15, the backup ring 50 must also be moved to a concentric position with socket 15. The cylinders 54 are manifolded together for selectably raising or lowering backup ring 50. Cylinders 54 are readily removable for protection and reuse after installation. A minimum of three wedges is required for stability, but use of more wedges reduces the circumferential bending stresses in the socket.

Referring to FIGS. 10 and 11, four identical slip wedges 60 are used to interact with the corresponding ramps 16 of the socket 15 to provide lateral restraint to the stabbing member 34. Slip wedges 60 have a cylindrical inner surface 61 with a diameter equal to that of the neck of stabbing member 34. The wedge outer face 62 is planar and inclined to the axis of the cylindrical inner surface 61 by the same angle as the ramps 16 are inclined to the socket axis. The transverse sides of slip wedges 60 are parallel and vertical, while the upper and lower faces are transverse to the axis of inner surface 61. The upper face of wedge 60 is drilled and tapped for adaptation to lowering and pulling devices (not shown). The width of the wedges 60 is less than that of their corresponding ramps 16 by at least twice the amount of maximum axial eccentricity between the socket 15 and the stabbing member 34 anticipated for the design. Although not shown here, the wedges 60 may be drilled and tapped for the attachment of bolting which will prevent the wedges from riding up in or dropping farther into the slip bowl formed by ramps 16 when the connector "works" under cyclical marine loads.

The materials of construction are generally structural steel for the hull, the space frame 6, and the damper 7 of the invention. The stabbing member 34, box beam 40, and the socket 15 will also be structural steel, but typically with a higher yield strength than for the hull and space frame 6. Slip wedges 60, backup ring 50, and segmented locking ring 42 of the connector 8 will be fabricated from a high-strength, low-alloy steel such as SAE 4130, 4140, or 4340.

The invention is assembled in the following manner. Referring to FIGS. 5 and 6, the space frame 6 supporting the damper 7 is lowered as described in copending U.S. patent application Ser. No. 09/686,535, with the following three exceptions: First, the winches are placed outside the deck 2 above the tops of the columns of the semisubmersible rig 1. Second, the winches double as mooring winches. Third, the chains handled by the winches attach to the damper 7 rather than to the truss chords.

At the time that this lowering activity is proceeding, the hull is still ballasted so that the top of lower pontoon 4 is not awash. Various assembly aids can be deployed in advance of the completion of the lowering operation, so that workers will have handling means and access as needed to the various pieces which must be inserted into place to complete connection assembly. As lowering continues from the state shown in FIG. 5 to that shown in FIG. 6, where the lower end of the upset head 35 is resting on the floor 22 of socket 15, the stabbing of the stabbing members 34 into the sockets 15 simultaneously occurs for all the connectors 8. While the space frame 6 is guided to a large extent by conventional guide rails and other means familiar to those skilled in the art, the necessity for operating clearances when lowering inevitably leads to some axial eccentricity in the connectors 8. Additionally, some variation in intended spacing between the sockets 15 and between the stabbing members 34 due to fabrication tolerances will be present. Consequently, the connectors 8 will be stabbed axially eccentrically. However, reasonable control over the fabrication tolerances and guide clearances will ensure that the eccentricities obtained will be within the tolerable limits for the connectors 8. When the stabbing members 34 have the weight of the damper 7 and space frame 6 resting on the floors 22, the resultant axial loads will be sufficient to ensure that typical wave and current loading and vessel motions will be unable to overcome static friction and cause lateral shifting of the stabbing members 34 in the sockets 15 during final assembly.

Figure 7:
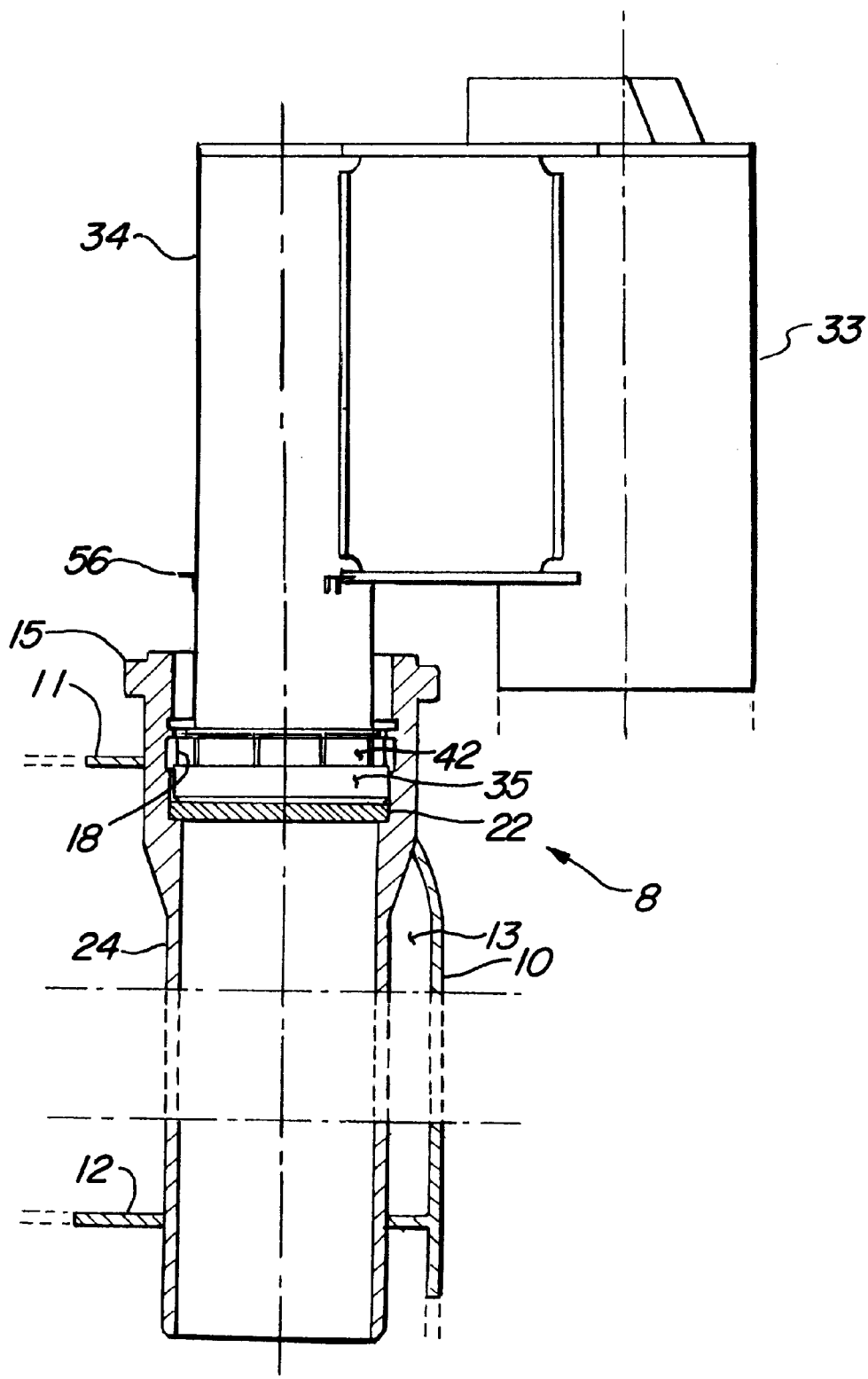
FIG. 7 is a vertical cross-sectional view corresponding to FIG. 5 and showing the locking ring segments expanded into the latching groove of the socket so that the plug is restrained against axial motion relative to the socket. The cylinders for installing the backup ring for the locking ring segments have been removed preparatory to completing the connection.

As soon as the lowering is complete, the retainer or retention strap 48 retaining the segments of locking ring 42 around the tubular neck of the stabbing member 34 can be removed. At that point, hydraulic cylinders 54 are activated to lower backup ring 50. Backup ring 50 begins to radially force the segments of locking ring 42 into the annular latching groove 18 through wedging action between the tapered bore 44 of the locking ring and tapered outer surface 51 of the backup ring 50. Cylinders 54 are able to angularly shift in their mounts, and the connections of cylinder rods 75 to the top of backup ring 50 also can swivel. Backup ring 50 can thus shift to centralize itself within socket 15 and fully extend all of the segments of segmented locking ring 42 into groove 18. As seen in FIG. 9, since the bore of backup ring 50 is sufficiently larger than the neck of stabbing member 34 by design, the eccentricity of the stabbing member 34 does not impair the extending of the segments of locking ring 42 into annular latching groove 18. As further downward force is exerted on backup ring 50, the upper conical shoulder 43 of the segmented locking ring 42 wedges downwardly against the mating upper conical surface 20 of latching groove 18. This wedging action eliminates any rattle of segmented locking ring 42 and attendant stress amplification. Locking ring 42 is also seated downwardly against the upset head 35 of the stabbing member 34, which in turn bears against the floor 22. The lower side of floor 22 similarly bears on the upward looking transverse shoulder 21 of socket 15. As a result, the vertical slack in the connection is removed. At this point the hydraulic cylinders 54 can be removed and stored for future use. The connector 8 is then in the condition shown in FIG. 7. If desired, the backup ring 50 can be restrained against vertical movement by clamp bolts or similar means. However, this is not essential and is not shown because the angle between tapered bore 44 of the segmented locking ring 42 and the outer surface 51 of the backup ring 50 is chosen to be a non-slipping angle.

Referring to FIGS. 10 and 11, following the vertical locking of the connection 8, the four wedges 60 are set sequentially into their respective ramps 16. The setting of wedges 60 is done in the following manner. Each wedge 60 is positioned near its respective ramp 16 with its planar outer face 62 parallel to its ramp 16 and is supported above the top of the socket 15. The wedge 60 is then shoved radially inwardly and laterally until the cylindrical inner surface 61 of the wedge conforms closely to the cylindrical surface of the neck of stabbing member 34. At this point the wedge 60 is lowered until it fully contacts both the ramp 16 and the neck of stabbing member 34. When the stabbing member is eccentric to the socket 15 in the tangential direction of the ramp 16, the final position of that wedge 60 will be laterally shifted in the ramp 16. This lateral shifting is possible because the lateral width of the wedge 60 is by design sufficiently less than the width of ramp 16 so that the full eccentricity of stabbing member 34 can be accommodated. If necessary, bolts and auxiliary mounting clips can be added to ensure that the wedge 60 can neither slip into a tighter fit nor work upwardly into a looser fit, although these details are not shown herein. The angle of ramp 16 is sufficiently small to be frictionally self-locking.

If the stabbing member 34 is stabbed so that it is shifted from the center line of socket 15 towards the ramp 16 of a given wedge 60, then that wedge will seat higher on its ramp than for a concentric stab. Similarly, shifting of a stabbing member 34 away from a ramp 16 of a given wedge 60 will cause that wedge to seat lower.

Disassembly of the connectors 8 is done by using pullers and/or the cylinders 54 and reversing the assembly steps. However, in order to extract the segmented locking ring 42 from the annular latching groove 18, a pry bar or similar means is required. The pry bar levers against upper extension 45 of segmented locking ring 42 and thereby moves the ring segments back onto the upper shoulder of upset head 35 of stabbing member 34. At that point, the segments of locking ring 42 and upset head 35 of stabbing member 34 can be withdrawn from socket 15.

The nonconcentric structural connector of this invention provides very high load capacity, high stiffness, robustness, and high tolerance for misfit between the mating connector sides. Additionally, the connectors of this invention are readily assembled in the field and likewise are readily disassembled in a repeatable manner. These connectors provide a realistic, practical means for rapid makeup of the connection of damper plate support space frames to the hull of a semisubmersible production vessel in the field in an exposed location, so that exposure can be limited to severe environmental loading while partially connected. An additional advantage is that a simpler, less expensive, more reliable connector design results from the minimization of lateral loads on the connectors by virtue of the pattern of mounting of the connectors.

The use of the segmented locking rings with their associated backup ring provides a structurally efficient, reliable vertical restraint to separation of the connector under load. Both the segmented locking ring 42 and the backup ring 50 are loaded primarily in compression and shear, rather than the less efficient bending mode. Likewise, the slip wedges 60 are primarily loaded in compression. The behavior of the socket 15 and the stabbing member 34 are readily analyzed and hence well understood. The connectors are relatively simple to fabricate and do not require precision manufacturing.

Various assembly aids readily can be used to simplify the effort of connection assembly and disassembly. The simplicity of the design makes it possible to utilize diver disassembly of the connectors if necessary. Hazardous, time-consuming, or high-skill assembly activities are avoided by the simple construction of the connectors.

It can be understood by those skilled in the art that various modifications of details of the connectors can be made without departing from the spirit of the invention. For instance, the number and size of slip wedges can be varied, as can the attachment of the socket to the hull. Likewise, changing the means of attachment of the stabbing member 34 to the space frame 6 to a braced connection would not deviate from the spirit of the invention. Instead of a boxed beam, the connection means between the stabbing member 34 and space frame extension tube 33 could use a diagonalized truss or a vierendiehl truss or an unboxed beam.

The high capacity nonconcentric structural connector of the present invention, and many of its intended advantages, will be understood from the foregoing description of an example embodiment, and it will be apparent that, although the invention and its advantages have been described in detail, various changes, substitutions, and alterations may be made in the manner, procedure, and details thereof without departing from the spirit and scope of the invention, as defined by the appended claims, or sacrificing all of its material advantages, the form hereinbefore described being exemplary embodiment thereof.

We claim:

1. A connector for removably attaching a space frame to a hull of a floating offshore platform, which comprises:

a socket attached to the hull of the platform, the socket having an open bore therein;

a stabbing member attached to the space frame, the stabbing member having a lower end insertable into the socket;

an expandable locking ring carried by the lower end of the stabbing member, the locking ring comprising a plurality of ring segments for removably seating within the socket bore; and a backup ring slidable along the stabbing member, the backup ring removably mating to the locking ring.

2. The connector of claim 1, wherein the locking ring removably seats within a latching groove in the socket bore.

3. The connector of claim 2, wherein the locking ring includes an upper shoulder thereon for removably seating to a corresponding surface of the latching groove.

4. The connector of claim 3, wherein the locking ring further includes an upper extension portion extending above the upper shoulder thereon for receiving a retention strap thereon.

5. The connector of claim 1, further including a plurality of slip wedges removably seatable within the socket bore and against the stabbing member.

6. The connector of claim 5, wherein the slip wedges seat onto respective ramps formed in the socket bore wall, the ramps having surfaces inclined with respect to the socket bore wall.

7. The connector of claim 1, wherein the socket includes a floor within its open bore.

8. The connector of claim 7, wherein the floor is supported at its edges by a shoulder formed in the socket bore wall.

9. The connector of claim 7, wherein the stabbing member includes an upset head at its lower end, the upset head removably seatable on the socket floor.

10. The connector of claim 9, wherein the locking ring removably seats onto the upset head of the stabbing member.

11. The connector of claim 1, wherein the backup ring has a tapered outer surface which mates to a tapered bore of the locking ring.

12. The connector of claim 1, wherein the socket includes a ring stiffener thereon.

13. The connector of claim 1, wherein the hull includes at least one pontoon thereon, and wherein the socket is structurally supported by the pontoon.

14. The connector of claim 13, wherein the pontoon comprises a top shell, a side shell attached to the top shell, and a lower framing bulkhead attached to the side shell, and wherein the socket is attached to the top shell and to the lower framing bulkhead and to the side shell through an interconnecting internal bulkhead.

15. The connector of claim 1, further including a structure for attaching the stabbing member to the space frame.

16. The connector of claim 15, wherein the structure comprises a box beam.

17. The connector of claim 16, wherein:
the space frame includes an extended vertical chord thereon; and
the box beam connects the stabbing member to the extended vertical chord.

18. The connector of claim 17, wherein the box beam comprises:
a pair of side plates attached between a side wall of the stabbing member and a side wall of the extended vertical chord;
a top plate connecting the top of the stabbing member with the top of the extended vertical chord; and
a bottom plate attached between the side wall of the stabbing member and the side wall of the extended vertical chord.

19. The connector of claim 17, wherein the axis of the stabbing member is parallel to and laterally offset from the extended vertical chord of the space frame.

20. The connector of claim 16, wherein the platform has a well therein, and further including a lowering guide associated with the box beam for centralizing the space frame within the well of the platform.

21. The connector of claim 1, further including means for lowering the backup ring from a raised position above the socket to a lowered position seated within the socket.

22. The connector of claim 21, wherein the means for lowering the backup ring comprises at least one hydraulic cylinder attached to the stabbing member, the hydraulic cylinder including an actuating rod extendible therefrom, a lower end of the actuating rod being attached to the backup ring.

23. The connector of claim 22, wherein a lower end of the hydraulic cylinder connects to the stabbing member through a swivel mount for permitting the hydraulic cylinder to swivel with respect to the stabbing member;
and wherein the actuating rod is connected to the backup ring through a ball swivel for permitting the actuating rod to swivel with respect to the backup ring.

24. The connector of claim 22, wherein the means for lowering the backup ring comprises three of said hydraulic cylinders.

25. A connector for removably attaching a space frame to a hull of a floating offshore platform, which comprises:
a socket attached to the hull of the platform, the socket having an open bore therein, a floor in the open bore, and a latching groove formed in the socket bore;
a stabbing member attached to the space frame, the stabbing member having a lower end insertable into the socket and an upset head at its lower end, the upset head being removably seatable on the socket floor;
an expandable locking ring carried by the lower end of the stabbing member, the locking ring comprising a plurality of ring segments for removably seating within the latching groove in the socket bore, the locking ring having a tapered bore therein;
a backup ring slidable along the stabbing member, the backup ring having a tapered outer surface for removably mating to the tapered bore of the locking ring;
a plurality of slip wedges removably seatable within the socket bore and against the stabbing member; and
means for lowering the backup ring from a raised position above the socket to a lowered position seated within the socket.

26. The connector of claim 25, wherein the locking ring includes:
an upper shoulder thereon for removably seating to a corresponding surface of the latching groove; and
an upper extension portion extending above the upper shoulder thereon for receiving a retention strap thereon and for prying the locking ring segments out of the groove.

27. The connector of claim 25, wherein the slip wedges seat onto respective ramps formed in the socket bore wall, the ramps having surfaces inclined with respect to the socket bore wall.

28. The connector of claim 27, wherein the ramps are wider than the slip wedges, whereby the slip wedges may move laterally on the ramps so that the socket accommodates the stabbing member when inserted eccentrically therein.

29. The connector of claim 25, wherein the locking ring removably seats on the upset head of the stabbing member.

30. The connector of claim 25, wherein the hull includes at least one pontoon thereon, the pontoon comprising a top shell, a side shell attached to the top shell, and a lower framing bulkhead attached to the side shell, and wherein the socket is attached to the top shell and to the lower framing bulkhead and to the side shell through an interconnecting internal bulkhead.

31. The connector of claim 25, wherein:
the space frame includes an extended vertical chord thereon, and further including a box beam for attaching the stabbing member to the extended vertical chord of the space frame.

32. The connector of claim 31, wherein the box beam comprises:
a pair of side plates attached between a side wall of the stabbing member and a side wall of the extended vertical chord;
a top plate connecting a top of the stabbing member with a top of the extended vertical chord; and
a bottom plate attached between the side wall of the stabbing member and the side wall of the extended vertical chord.

33. The connector of claim 25, wherein the means for lowering the backup ring from a raised position to a lowered position comprises a plurality of hydraulic cylinders attached to the stabbing member, each hydraulic cylinder including an actuating rod extendible therefrom, a lower end of the actuating rod being attached to the backup ring.

34. A method of connecting a space frame to a hull of a floating offshore platform, which comprises:
inserting the lower end of a stabbing member attached to the space frame into a socket attached to the hull of the platform, the stabbing member carrying an expandable locking ring thereon;
lowering a backup ring into mating engagement with the locking ring so as to expand segments of the locking ring into engagement with the socket wall; and
lowering a plurality of slip wedges into engagement with the socket wall and into engagement with the stabbing member for providing lateral restraint to the stabbing member.

35. The method of claim 34, further including the step, after inserting the stabbing member into the socket, of removing a retainer from the locking ring for permitting the locking ring segments to expand radially when engaged by the backup ring.

36. The method of claim 34, wherein the backup ring is supported above the socket by a cylinder rod of at least one hydraulic cylinder, and wherein the backup ring is lowered into engagement with the locking ring by activating the at least one hydraulic cylinder to extend the cylinder rod therefrom.

37. The method of claim 34, further including the step, after lowering the backup ring into mating engagement with the locking ring, of restraining the backup ring against vertical movement.

38. The method of claim 34, further including the step, after lowering the slip wedges into engagement with the socket wall and the stabbing member, of restraining the slip wedges against shifting within the socket.

39. A connector for removably attaching a space frame to a hull of a floating offshore platform, which comprises:
 a socket attached to the hull of the platform, the socket having an open bore therein;
 a stabbing member attached to the space frame, the stabbing member having a lower end insertable into the socket;
 means for resisting axial loads acting on the connector; and
 means for resisting lateral loads acting on the hull and the space frame.

40. The connector of claim 39, wherein the means for resisting axial loads comprises an expandable locking ring carried by the lower end of the stabbing member, the locking ring comprising a plurality of ring segments for removably seating within the socket bore.

41. The connector of claim 40, wherein the means for resisting axial loads further comprises a backup ring slidable along the stabbing member, the backup ring removably mating to the locking ring.

42. The connector of claim 40, wherein the locking ring removably seats within a latching groove in the socket bore.

43. The connector of claim 42, wherein the locking ring includes an upper shoulder thereon for removably seating to a corresponding surface of the latching groove.

44. The connector of claim 43, wherein the locking ring further includes an upper extension portion extending above the upper shoulder thereon for receiving a retention strap thereon.

45. The connector of claim 39, wherein the means for resisting lateral loads comprises a plurality of slip wedges removably seatable within the socket bore and against the stabbing member.

46. The connector of claim 45, wherein the slip wedges seat onto respective ramps formed in the socket bore wall, the ramps having surfaces inclined with respect to the socket bore wall.

47. The connector of claim 46, wherein the ramps are wider than the slip wedges, whereby the slip wedges may move laterally on the ramps so that the socket accommodates the stabbing member when inserted eccentrically therein.

48. Connection means for joining a space frame to a floating vessel hull in order to produce a connection between the vessel hull and the space frame that has substantial strength and stiffness in the vertical and all horizontal directions, which comprises:
 a plurality of spaced connectors attaching the space frame to the vessel hull, each connector having a vertical axis offset from the space frame such that a vertical midplane is defined by the vertical axis of the connector and the center of its attachment to the space frame;
 each connector further having relatively high strength and stiffness for resisting horizontal loads acting parallel to its vertical midplane but having relatively low strength and stiffness for resisting horizontal loads acting transverse to its vertical midplane; and
 each connector further being oriented so that its vertical midplane is normal to the vertical midplane of at least one adjacent connector, whereby loads which otherwise would act transversely to the vertical midplane of each connector are substantially carried by at least one of the adjacent connectors.

49. The connection means of claim 48, wherein the space frame has four corners, and wherein four of the spaced connectors attach the space frame to the vessel hull, one of the connectors being disposed at each corner of the space frame.

50. The connection means of claim 49, wherein the connectors disposed at opposite corners of the space frame have vertical midplanes that are parallel to one another, and wherein the connectors disposed adjacent to one another have vertical midplanes that are perpendicular to one another.

51. The connection means of claim 48, wherein each connector of said connection means further has a relatively high strength and stiffness for resisting vertical loads acting parallel to its vertical axis.

52. The connection means of claim 48, wherein each connector of said connection means comprises:
 a socket attached to the vessel hull, the socket having an open bore therein; and
 a stabbing member attached to the space frame, the stabbing member having a lower end insertable into the socket.

53. The connection means of claim 52, wherein each connector further includes:
 an expandable locking ring carried by the lower end of the stabbing member, the locking ring comprising a plurality of ring segments for removably seating within the socket bore; and
 a backup ring slidable along the stabbing member, the backup ring removably mating to the locking ring.

* * * * *

UNITED STATES PATENT AND TRADEMARK OFFICE
CERTIFICATE OF CORRECTION

PATENT NO. : 6,524,032 B2
DATED : February 25, 2003
INVENTOR(S) : Larry R. Russell and Phillip A. Abbott It is certified that error appears in the above-identified patent and that said Letters Patent is hereby corrected as shown below:

Column 7,
Line 23, "comers" should read as -- corners --

Column 16,
Line 30, "comer" should read as -- corner --

Signed and Sealed this

Sixth Day of July, 2004

JON W. DUDAS
*Acting Director of the United States Patent and Trademark Office*